United States Patent [19]

Burnett

[11] Patent Number: 4,964,124

[45] Date of Patent: Oct. 16, 1990

[54] COMPUTER PERIPHERAL TESTER

[75] Inventor: David G. Burnett, Southfield, Mich.

[73] Assignee: World Computer Corporation, Auburn Hills, Mich.

[21] Appl. No.: 291,108

[22] Filed: Dec. 27, 1988

[51] Int. Cl.$^5$ ............................................. G06F 11/00
[52] U.S. Cl. .................................... 371/15.1; 371/29.1
[58] Field of Search ................... 371/15.1, 16.1, 16.4, 371/22.1, 17, 29.5, 29.1; 324/73 R, 73.1; 364/200 MS File

[56] References Cited

U.S. PATENT DOCUMENTS

| | | | |
|---|---|---|---|
| 3,869,580 | 3/1975 | Ragsdale | 371/24 |
| 4,224,690 | 9/1980 | Rockwell | 371/25 |
| 4,298,982 | 11/1981 | Auerbach | 371/30 |
| 4,489,414 | 12/1984 | Titherley | 371/20 |
| 4,502,113 | 2/1985 | Katoh | 364/200 |
| 4,567,592 | 1/1986 | Minicilli | 371/16.4 X |
| 4,667,329 | 5/1987 | Murray, Jr. et al. | 371/24 |
| 4,694,408 | 9/1987 | Zaleski | 364/551 |
| 4,703,482 | 10/1987 | Auger et al. | 371/16.1 |
| 4,707,849 | 11/1987 | Rault | 371/16.4 X |
| 4,718,064 | 1/1988 | Edwards et al. | 371/20 |
| 4,788,683 | 11/1988 | Hester | 371/16.1 |
| 4,810,958 | 3/1989 | Mogi | 371/15.1 X |
| 4,837,764 | 6/1989 | Russello | 371/15.1 X |

Primary Examiner—Jerry Smith
Assistant Examiner—Robert W. Beausoliel
Attorney, Agent, or Firm—Basile and Hanlon

[57] ABSTRACT

A computer peripheral tester includes a central processing unit and a memory for storing peripheral test data and control program instructions. A keypad input and display are connected to the central processing unit. A serial communication interface converts parallel data to and from the central processing units to and from serial data. A parallel communication interface interfaces the central processing unit to a computer peripheral for parallel data transfer. A connector is mounted on the computer peripheral tester for attaching the computer peripheral tester to the data communication cable of a computer peripheral. A serial data communication configuration circuit, responsive to the central processing unit, configures the connector to transmit and receive serial data with respect to the computer peripheral under test. A serial/parallel switch selectively connects the serial communication interface and the parallel communication interface to the connector means for serial and parallel data communication between the central processing unit and the computer peripheral under test.

11 Claims, 9 Drawing Sheets

COMPUTER PERIPHERAL TESTER

BACKGROUND OF THE INVENTION

Field of the Invention

The present invention relates, in general, to computers and, specifically, to computer peripherals, such as printers, multiplexers and CRTs, which are connected to computers, and, more specifically, the test equipment for testing the operation of computer peripherals.

Computer systems typically include a central or main computer which is connected by various data, address and control busses to a plurality of computer peripherals, such as printers, multiplexers and CRT terminals. It is often necessary to test each peripheral and its attached data communication cable for proper operation as well as to locate and isolate any malfunctions in the overall computer system in the computer mainframe or computer peripheral.

Previously, computer manufacturers have provided such testing via diagnostic tapes used on magnetic tape drives and run under control of a main computer. Such testing runs various test programs which check the general operation of the subsystem consisting of a peripheral, cable and controller as a whole without regard to the treatment of each component as a separate entity. Further, the testing of the peripheral is typically done offline, that is, when the main computer is not running other programs.

Computer peripherals come in a variety of types and utilize different data transfer formats, such as serial or parallel as well as various serial baud transmission rates, and parity check and stop bits formats. Further, some peripherals are labeled data communication equipment (DCE) or data terminal equipment (DTE) each having their own serial data transmit and receive pin configurations.

Testing such peripherals has been difficult since most computer controlled diagnostics only offer a go/no go means of testing the entire subsystem. No indication is given as to the failing component. Further, there is the online/offline problem which requires the main computer to be run offline to test the peripherals; wasting valuable system time.

What is needed is a computer peripheral tester which may be utilized to test a peripheral and/or its cable when the computer is online and running other programs. It would be desirable to provide a computer peripheral tester which is portable and easily attachable to a computer peripheral. It would also be desirable to provide a computer peripheral tester which can be easily employed to detect malfunctions in a computer peripheral or in the data communication cable attached to the peripheral. It would also be desirable to provide a computer peripheral tester which is versatile in use in that different peripheral characteristics may be software selected to configure the peripheral tester to the data transmission characteristics of a large number of different types of computer peripherals. Finally, it would be desirable to provide a computer peripheral tester which is programmable for either serial or parallel data communication with a computer peripheral.

SUMMARY OF THE INVENTION

The present invention is a computer peripheral tester suited for testing the operation of a computer peripheral, such as a printer, multiplexer or CRT, and its cable. The subject computer peripheral tester is a self-contained, portable, hand-held unit attachable to the data communication cable connected to a computer peripheral. The computer peripheral tester of the present invention is capable of generating and running a number of different tests for testing the operation of the computer peripheral and the peripheral data communication cable.

The computer peripheral tester of the present invention includes a central processing means and a memory means for storing the data and control program instructions executed by the central processing means. A keyboard means is provided to input commands to the central processing means. A display, also responsive to the central processing means, is provided for displaying menus and test and data characters. A serial communication interface means is provided for converting parallel data from the central processing unit to serial data and serial data to parallel data which is input to the central processing means. Also, a parallel communication interface means is provided for interfacing the central processing means to a computer peripheral for parallel data communication. Connector means mounted in the housing containing the computer peripheral tester circuitry is provided for connecting the central processing means to the data communications cable attached to a selected computer peripheral. Bus means are provided for connecting the central processing means, the memory means, the keyboard input means, the display means, the serial and parallel communication interface means and a RS232 serial data communication configuration means in data communication.

The RS232 serial data communication configuration means is responsive to the central processing means and the keyboard input means for configuring the connecting means to transmit and receive data with respect to a computer peripheral. Finally, serial/parallel switch means are provided for selectively connecting the connector means for either serial or parallel data communication between the central processing means and the computer peripheral under test.

In a preferred embodiment, the serial/parallel switch means comprises a manually operated switch mounted on the housing of the computer peripheral tester. The switch is movable between two positions respectively corresponding to serial and parallel data communication modes. The switch selectively connects four pins of the connector means to the serial communication interface means or to the parallel communication interface means for serial or parallel data communication between the central processing means and the peripheral under test.

The RS232 serial data communication configuration means comprises second switch means, such as relays, operable under central processing means program control and selectible through the keyboard input. The second switch means control the serial data communication paths on two pins of the connector means. In a first position, the second switch means is configured to connect pin two of the connector means for transmitting data and pin three for receiving data. In the other position, the second switch means reverses this order and connects the pin two of the connector to receive data and the pin three for transmitting data thereby enabling the computer peripheral tester of the present invention to be configured to test any type of computer peripheral, whether DTE or DCE equipment.

A programmable baud rate generator means is connected to the data bus of the peripheral tester and is input to the serial communication interface means. The programmable baud rate generator means establishes a selectable, predetermined, serial data transfer baud rate. A coded signal from the central processing means selects a predetermined baud rate used to transmit and receive serial data from the central processing means and the peripheral under test.

The memory of the computer peripheral tester contains programs which are capable of generating one of a number of different peripheral tests, such as for example, a sliding or full character test, a data monitor test, a document printer test, a line printer test, a line printer status check, a Qume font menu, a pin assignment test, a self test, an ASCII reference table and a keypad test.

In operating any of these tests, the computer peripheral tester of the present invention is programmable to configure the tester with any set of data transfer parameters to match those employed in the peripheral under test. These parameters include, for example, serial or parallel data transfer, baud rate, parity convention, stop formats, page width, as well as configuring the computer peripheral tester for communication with DTE or DCE peripherals.

The computer peripheral tester of the present invention is configured as a portable, hand-held unit which is easily attachable to a large number of different types of computer peripherals. This enables a peripheral to be tested while the main computer, to which the peripheral is associated, is still running online eliminating system down time. The computer peripheral tester of the present invention is programmable so as to be configured for testing a large number of different types of computer peripherals, each of which has its own data communication characteristics.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Throughout the following description and drawing, an identical reference number is used to refer to the same component shown in multiple figures of the drawings.

Figure 1:
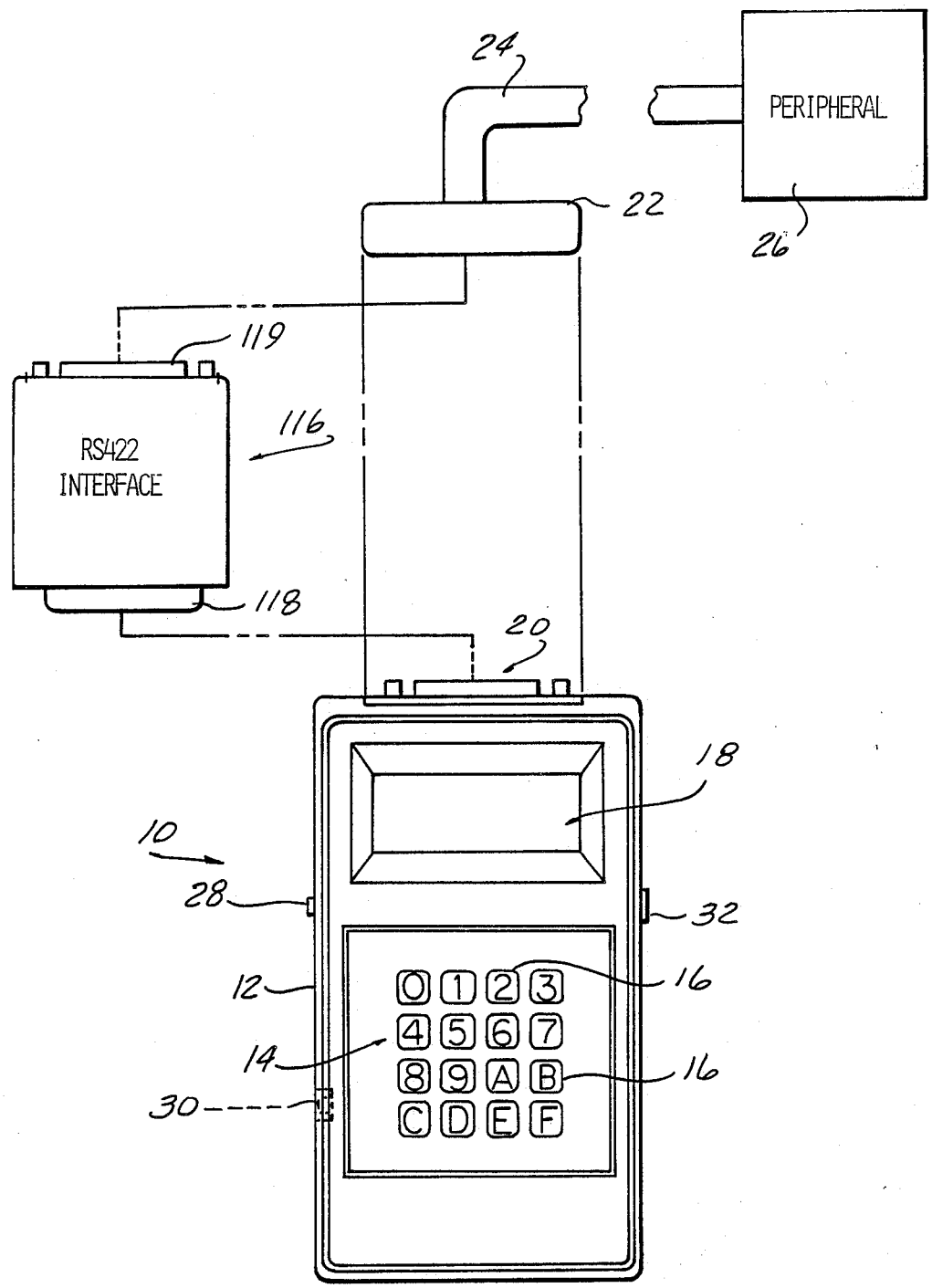
FIG. 1 is a pictorial view of the computer peripheral tester of the present invention.

Referring now to the drawing, and to FIG. 1 in particular, there is illustrated a computer peripheral tester 10 suited for testing the operation of most computer peripherals, such as printers, CRTs, multiplexers, etc., regardless of the data communication configuration of such peripherals or whether such peripherals utilize serial or parallel data communication with a computer.

As shown in FIG. 1, the peripheral tester 10 includes a hand-held, portable housing 12 formed of two separable sections defining an internal chamber, the circuitry of the peripheral tester 10 arranged in two printed circuit boards connected by a flat ribbon cable is mounted in the housing 12. The housing 12 is preferably formed of a lightweight plastic for easy handling and transport of the peripheral tester 10.

A keypad input means 14 is mounted on the front face of the housing 12 of the peripheral tester 10. In a preferred embodiment, the keypad input menas is in the form of a 4×4 matrix membrane keypad containing 16 keys or pads 16. Alphanumeric indicia, such as numbers 0-9 and letters A, B, C, D, E and F, are assigned to each key or pad 16.

Display means 18 is also mounted on the front face of the housing 12. In a preferred embodiment, the display means 18 comprises a 16 character by two line liquid crystal display module (LCD), such as a display manufactured by Seiko. The display means 18 displays test data, operating parameters and program selection menus as described hereafter.

A connector means 20 is mounted in one side of the housing 12 of the peripheral tester 10. The connector means 20 preferably comprises a 25 pin D shell female connector mounted in the housing 12. The connector 20 removably receives a correspondingly formed male connector 22 attached to the end of a data communication cable 24 connected to the peripheral 26 under test. This provides data communication between the peripheral tester 10 and the peripheral 26 under test. The peripheral 26 which can be tested by the peripheral tester 10 can be any type of computer peripheral, such as drum, band, matrix or laser printers, multiplexers and CRTs, etc.

Figure 4A:
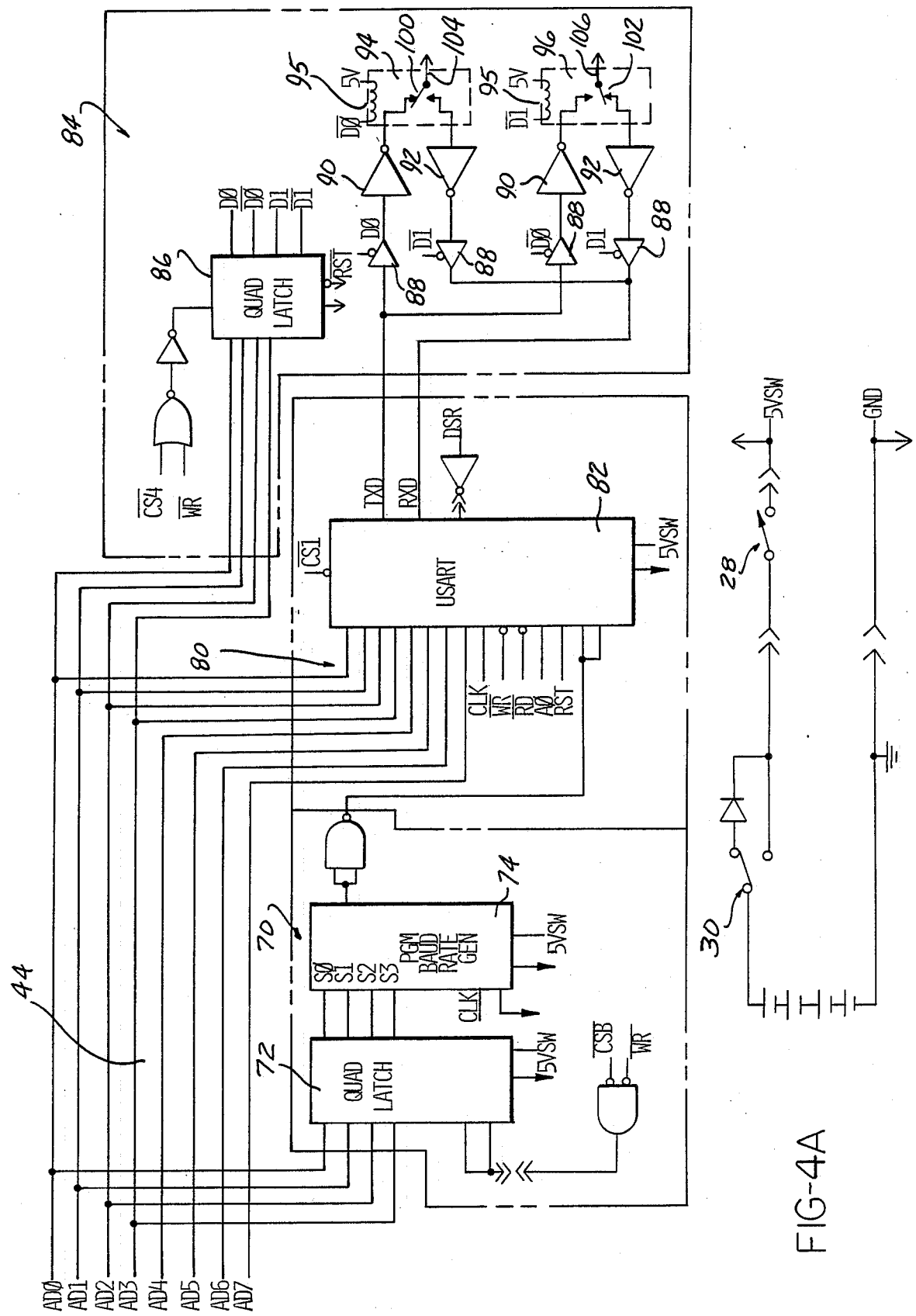
FIGS. 4A and 4B are detailed schematic diagrams of the remaining operative elements of the computer peripheral tester shown in FIG. 2.

A power on/off switch 28 is mounted on one side of the housing 28 and is operable to connect an electric power source 29 housed internally within the housing 12 to the operating circuitry of the peripheral tester 10. The internal power source 29 preferably comprises a plurality of storage batteries, such as four 1.25 volts Nickel Cadmium rechargeable batteries. Alternately, four 1.5 volt alkaline batteries may also be employed as the power source for the peripheral tester 10. However, due to the different voltage rating of alkaline batteries, a switch 30 is mounted in the housing 12 of the peripheral tester 10 and is connected, as shown in FIG. 4A, to a diode to adjust the output of the power source when alkaline batteries are utilized. The switch 30 is movable to one position when Nickel Cadmium batteries are used and to another position when alkaline batteries are employed.

On the opposite side of the housing 12, as shown in FIG. 1, there is provided a serial/parallel selector switch 32 which manually switches the peripheral tester 10 between serial and parallel data communication modes with the peripheral 26 under test, as described in greater detail hereafter.

Figure 2:
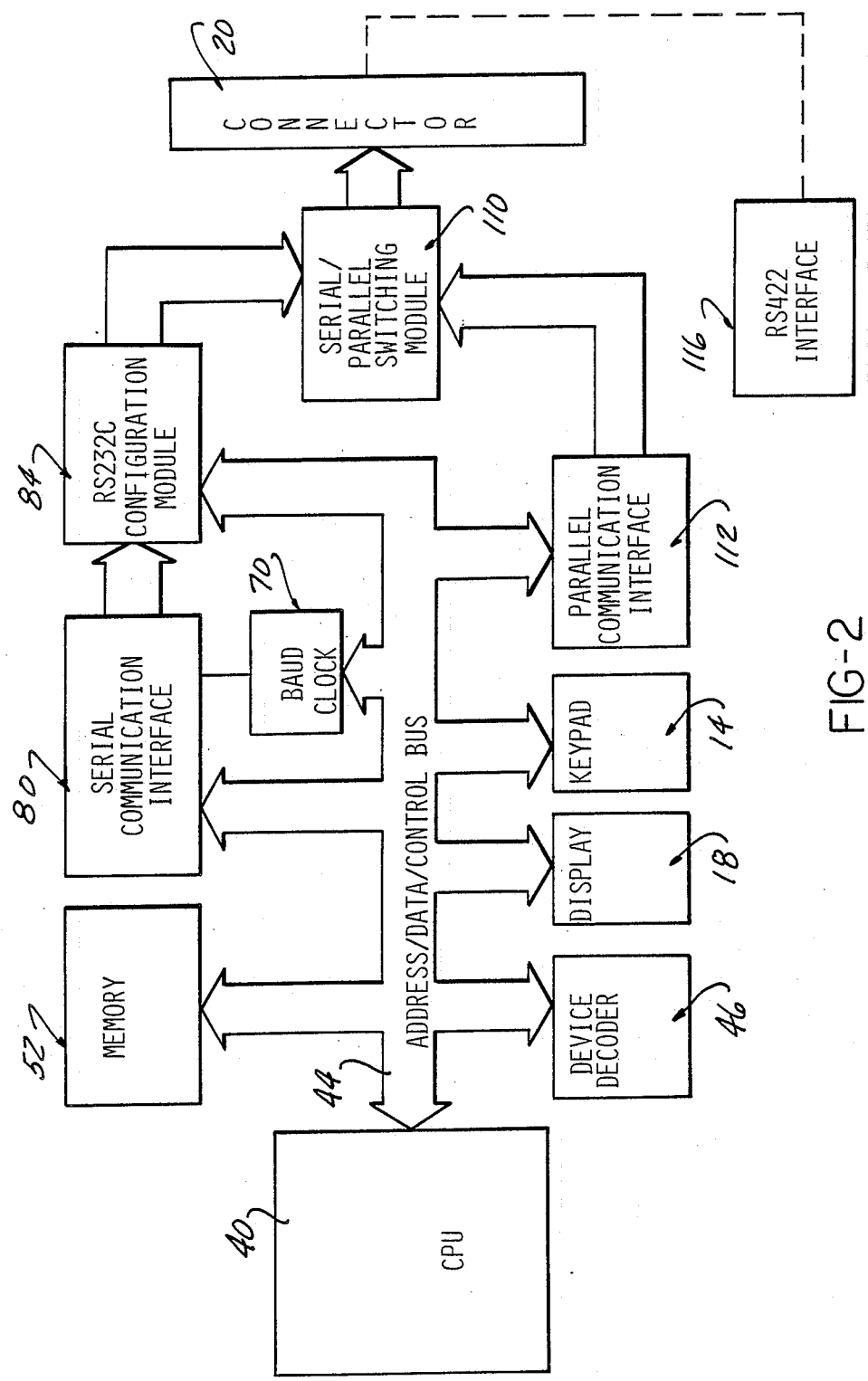
FIG. 2 is a block diagram of the computer peripheral tester of the present invention.
Figure 3A:
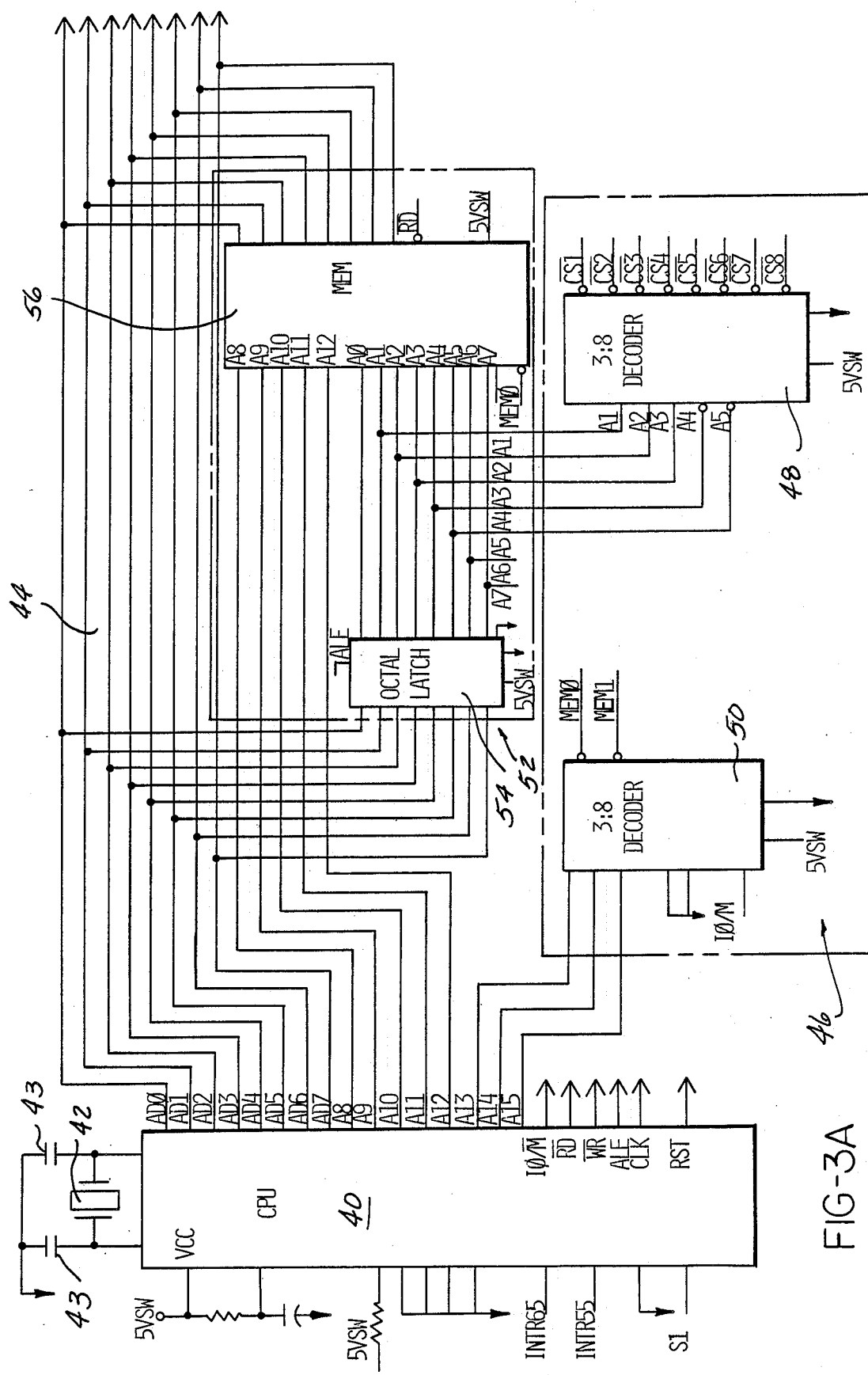
FIGS. 3A and 3B are detailed schematic diagrams of certain of the operative elements shown in FIG. 2.

FIGS. 2, 3A, 3B, 4A and 4B depict a block diagram and the detailed circuitry, respectively, of the peripheral tester 10 which is contained within the housing 12. As shown in FIGS. 2 and 3A, the peripheral tester 10 includes a central processing unit 40, such as a microprocessor. In a preferred embodiment, the microprocessor comprises an eight bit CMOS microprocessor manufactured by Intel as model number 80C85A-2. As shown in FIG. 3, a 4.9152 MHz quartz crystal 42 is connected to the CPU 40 to generate a system clock. A pair of capacitors 43 are connected to the crystal 42 to stabilize the resonant frequency of the crystal 42 on power up.

The CPU 40 sources a multiplexed address/data/control bus, hereafter referred to as the bus 44. The bus 44 contains the 16 bit address output of the CPU 40 as shown by outputs labeled AD0-AD7 and A8-A15 and eight data bits labeled AD0-AD7. The bus 44 carries address, data and control byte information between the CPU 40 and the various elements of the peripheral tester 10 as described in greater detail hereafter.

As shown in FIGS. 2 and 3, a device decoder means 46 is connected to the bus 44. The device decoder means 46 generates select signals in response to control commands from the CPU 40 which select one of the operative elements of the peripheral tester 10 for data communication on the bus 44 with the CPU 40. A 3:8 decoder 48 forms a part of the device decoder means 46. Inputs to the 3:8 decoder 48 are derived from the bus 44 as shown in FIG. 3. Outputs from the 3:8 decoder 48 on control lines labeled CS1-CS8 are connected to each of the operative elements of the peripheral tester 10 and act as a select or enable for each element.

The device decoder means 46 also includes a second 3:8 decoder 50 which in response to outputs from the CPU 40 generates memory control commands labeled MEM0 and MEM1 which are used to select the memories within the peripheral tester 10 as described hereafter.

The peripheral tester 10 also includes a memory means 52 for storing data and control program instructions executed by the CPU 40. An octal latch 54 is connected to the bus 44 and strobes the current address from the bus 44 to a memory chip 56. In a preferred embodiment, the memory 56 comprises an 8K×8 bit CMOS EPROM memory which is programmed with the control program instructions and data used to operate the peripheral tester 10 as described hereafter. The EPROM memory 56 may be expanded as necessary. Outputs from the memory 56 are connected to the bus 44. Connected as a select to the memory chip 56 is the output of the 3:8 decoder 50 in the device decoder means 46.

Figure 3B:
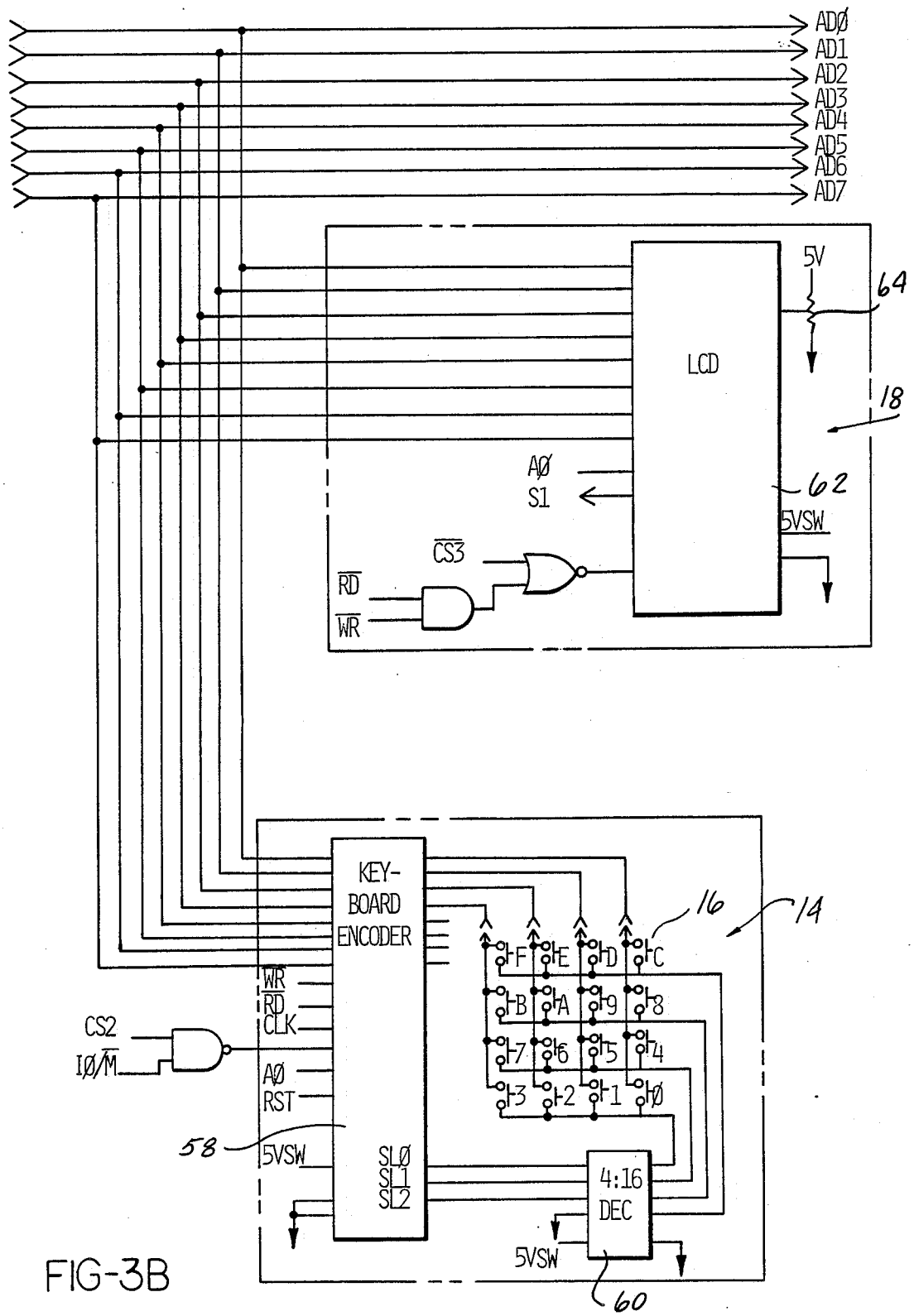

As shown in FIGS. 2 and 3B, the keypad input means 14 includes a keyboard encoder 58 model number 82C79P2 and a 4:16 decoder 60. The keyboard encoder 58 is connected to the bus 44 and develops binary encoded scan lines labeled SL0, SL1 and SL2 which are input to and decoded by the 4:16 line decoder 60. The outputs of the decoder 60 are connected to a 4×4 matrix membrane keypad containing a plurality of keys or pads 16 arranged in columns and rows as shown in FIG. 3B.

Once a key 16 is depressed, a binary encoded byte containing a row and column address is loaded into a FIFO (first in-first out) RAM in the keyboard encoder 58 for buffering. The keyboard encoder 58 generates a signal to interrupt the CPU 40 indicating each key 16 depression. In this manner, test selects, parameter inputs, etc., may be input via the keyboard input means 14 to the CPU 40.

The detailed circuitry of the display means 18 shown in FIGS. 1 and 2 is depicted in FIG. 3B. The display means 18 contains an LCD module 62 having on-board RAM, character generator and display controller for interpreting and executing command instructions from the CPU 40 on the bus 44. The LCD module 62 is connected to the bus 44 and various inputs are provided for controlling the operation of the LCD circuit 62. A potentiometer 64 is connected to the LCD module 62 to adjust the bias on the display for contrast.

As shown in FIG. 2 and in greater detail in FIG. 4A, the peripheral tester 10 also includes a programmable baud clock generator means 70. The baud clock generator means 70 includes a quad latch 72 and a bit rate generator 74. The quad latch 72 strobes data from the bus 44 regarding serial data transmission speed between the peripheral tester 10 and the peripheral 26 under test. The output from the quad latch 72 is input to a programmable bit rate generator 74 along with the system clock to develop a serial transmit/receive clock whose cycle is the selected baud rate times 16. The programmable baud rate generator 74 generates baud speeds of 1200, 2400, 4800 and 9600. The output from the baud clock generator means 70 is input to a serial communication interface means 80.

The serial communication interface means 80 includes a universal synchronous/asynchronous receiver transmitter 82, model number 82C51A-2, which has its inputs connected to the bus 44 and which generates transmit and receive outputs labeled T×D and R×D, respectively. The interface 80 receives command data bytes from the CPU 40 via the bus 44 containing the selected serial data format. Supported data formats include ⅛ bits data length, even/odd/none/mark parity, and ½ stop bits. Parallel data from the bus 44 is converted to a serial output and transmitted on output line T×D to a RS232C serial data communication configuration means 84. This data is transmitted asynchronously in a TTL serial bit data stream at a rate proportional to that generated by the baud rate generator means 74. Receive data functions in a similar but reverse manner. As serial data is received on line R×D, it is converted to parallel format and an interrupt to the CPU 40 is generated.

The RS232C serial data communication configuration means 84 shown in detail in FIG. 4A includes a quad latch 86, tri-state bus buffers 88, RS232C transmit drivers and receivers 90 and 92, respectively, and two switch means denoted by reference numbers 94 and 96, respectively. Four external capacitors, not shown, are conntected to the integrated circuit chip containing the drivers 90 and receivers 92 for voltage conversion and to bias the transmit drivers 90 and receivers 92.

The RS232C transmit drivers 90 are inverting level translators which convert the CMOS input levels to RS232C or V.28 voltage levels. The receivers 92 convert the RS232C/V.28 voltage levels to 5 V CMOS outputs. The receivers 92 respond to both RS232C/V.28 and TTL level inputs.

The outputs from the quad latch 86 are connected to the tri-state bus buffers 88 to energize the buffers 88 and to direct the flow of data between the serial communication interface means 80 and the connector means 20 of the peripheral tester 10 as described hereafter.

The outputs from the quad latch 86 are also input to the switch means 94 and 96. In a preferred embodiment, the switch means 94 and 96 comprise single pole-double throw mercury reed relays, each having a coil 95 energizable by the output from the quad latch 86. Each relay 94 and 96 contains a contact 100 and 102, respectively, which is switchable between two states as shown in FIG. 4A depending upon whether the associated coil 95 is energized or de-energized.

The quad latch 86 in conjunction with the tri-state bus buffers 88 and the switch means 94 and 96 cooperate to configure the output of the RS232C serial configuration means 84 for data communication equipment (DCE) or data terminal equipment (DTE) pin connections. DCE equipment transmits data on pin 3 and receives data on pin 2 of the connector and interconnecting cable. DTE Data terminal equipment, on the other hand, transmits data on pin 2 and receives data on pin 3. The RS232C configuration means 84 configures the peripheral tester 10 for data transfer with either DCE or DTE equipment under program control from the CPU 40.

Figure 4B:
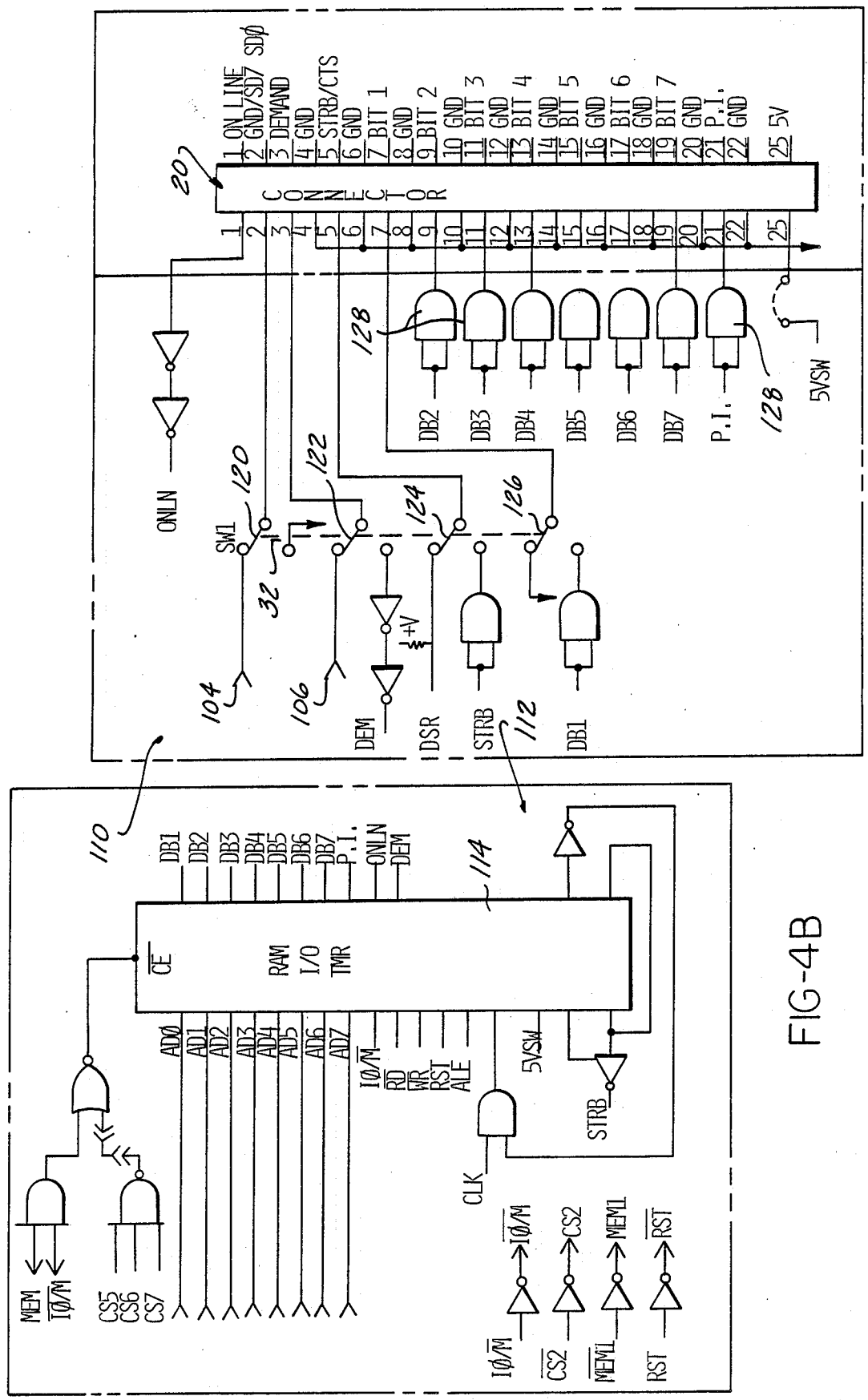

The outputs 104 and 106 from the switch means 94 and 96, respectively, are connected to a serial/parallel switching means 110 described in greater detail hereafter. As shown in FIG. 4B, with the coils 95 of the switches or relays 94 and 96 de-energized under control signals from the quad latch 84 and the CPU 40, line 104 is connected through the contact 100 to the transmit driver 90 for transmitting data from the RS232C serial configuration means 84 to the peripheral 26 connected to the peripheral tester 10. At the same time, line 106 is connected through contact 102 of the switch 96 to the receiver 92 for receiving data from the peripheral 26 under test. Energization of the coils 95 reverses the connections to receive data on line 104 and transmit date on line 106.

The peripheral tester 10 is also adaptable for communicating under program control with peripherals 26 which operate with parallel data transfer. Thus, the peripheral tester 10 is provided with a parallel communication interface means denoted by reference number 112 in FIGS. 2 and 4B. The parallel communication interface means 112 includes an integrated circuit model number 81C55-5 which contains a 256 byte RAM, three parallel ports and an I/O timer denoted as a unit by reference number 114. The integrated circuit 114 is connected to the CPU 40 via the bus 44. The parallel outputs from the circuit 114 contains seven output lines labeled DB1-DB7, two transfer control bits output to the connector 20 and two status bits receiving inputs from the peripheral 26 under test so as to interface the peripheral tester 10 to parallel operated peripheral devices 26. Pulse widths and general I/O timing is accomplished by variable data stored in the RAM memory of the circuit 114.

Figure 5:
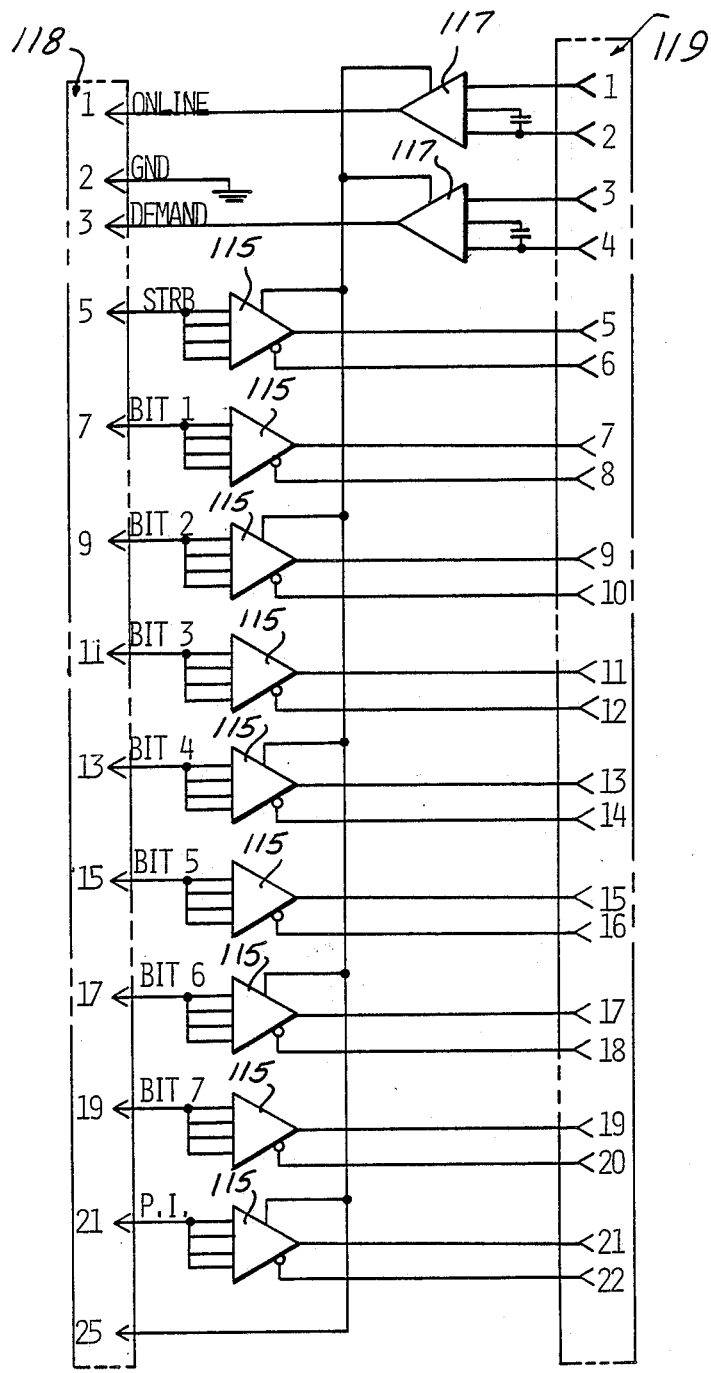
FIG. 5 is a schematic diagram of the RS422 module shown in FIG. 1.

In a preferred embodiment, the software controlled interface timing circuit 114 is compatible with peripherals manufactured by Data Products, Inc. and will communicate with all peripherals 26 containing a Data Products, Inc., parallel, single-ended interface. Using an optional RS-422 plug-in module 116, as shown in FIGS. 1 and 5 and described hereafter, peripherals using Data Products, Inc. differential interface may also be supported by the parallel communication interface 112. It should also be noted that software routines may be developed to support practically any parallel operating peripheral 26.

The 256 byte RAM contained in the parallel communication interface 112 is used to store flags, control information and variable data. The system software stored in the EPROM 56 controls the reading and writing of data into the RAM in the circuit 114.

The RAM also contains data used to control the I/O timing of the parallel interface. Each pin of the parallel port used in the parallel communication interface 112 is programmed for input (online "ONLN" and demand "DEM") and the remaining lines programmed for output (DB1-DB7, P. I., STRB).

The parallel communication interface 112 timing is controlled by variable data loaded into the RAM by the CPU 40 for use by the I/O timer section of the circuit 114. This variable data controls the time at which the strobe signal is asserted, the pulse width of the strobe signal, and the length of time the data bits are asserted onto the parallel bus. Since the I/O timer is, in effect, a counter, the variable data are delay times. By changing this data, the delay times are increased or decreased; thereby altering I/O timing.

The RS422 interface 116, shown in FIGS. 1 and 5, is contained in a plug-in housing having a first connector 118 matable with the connector 20 on the peripheral tester 10 and a second connector 119 matable with the connector 22 at the peripheral cable 24 end.

The RS422 interface 116 is a balanced double-current interchange using differential drivers 115 and receivers 117 to compensate for ground potential variations between transmitting and receiving equipment. It is used to increase the cable length to the serial or parallel peripheral 26 under test.

The module 116 contains CMOS differential (balanced) line drivers 115 model 88C30 and differential line receivers 117 model 88C20. The dual differential line drivers 115 accept TTL logic levels as input, and produce balanced differential outputs designed to drive long lengths of twisted pair transmission lines. The differential feature eliminates ground-loop errors associated with single-ended transmission.

The differential line receivers 117 accept a differential input designed to reject ground-loop and common-mode noise, while responding to small differential signals. The output of the receivers are directly compatible with TTL logic and meet the requirements of EIA standard RS232-C, RS422, and RS423. The RS422 module 116 is used only in conjuction with the parallel Data Products, Inc., interface; although one could be developed for the serial interface as well.

The outputs from the RS232C serial configuration means 84 and the parallel communication interface 112 are input to a serial/parallel switching means 110 as shown in FIGS. 2 and 4B. The serial/parallel switching means 110 includes a four pole, double throw, manually operated switch 32 mounted externally on the housing 12 of the peripheral tester 10. The switch 32 operates four switchable contacts 120, 122, 124 and 126. The contact 120 switches between the output 104 from the RS232C serial configuration means 84 and ground. Contact 122 is switchable between the connection to the line 106 of the RS232C serial configuration means 84 and a signal labeled DEM from the parallel interface 112. The contacts 120 and 122 are respectively connected to pins 2 and 3 of the connector 20 and provide switching of the pins 2 and 3 between serial and parallel data communication under program control of the CPU 40.

Contact 124 of the switch 32 is switchable between connection to a signal labeled DSR from the serial communication interface means 80 and a strobe signal labeled STRB from the parallel communication interface means 112 and provides such signals to pin 5 of the connector 20. Finally, contact 126 provides switchable connections between pin 7 of the connector 20 and ground or the first data bit labeled DB1 from the parallel communication interface 112.

The parallel data bits DB2-DB7 as well as a paper instruction control signal labeled PI are input through bus drivers 128, respectively, to separate pins in the connector 20. In operation, when the peripheral tester 10 is switched to the serial data transfer mode, the connector 20 pin assignment is configured as a function of the output from the RS232C serial configuration means 84 on lines 104 and 106 for communication with DCE or DTE peripherals 26. Pin 5 is also used in the serial mode to support hardward handshaking. In the parallel data communication mode, pin 2 is grounded and pin 3 provides a control signal labeled DEMAND. Data bit DB1, STROBE, data bits DB2-DB7 and paper instruction PI are output through the connector 20 to the peripheral 26 under test; while DEMAND and ON-LINE are statuses returned from the peripheral 26 under test.

As noted above, the peripheral tester 10 has a data and control information stored in the memory 56. The control program may be used to self test the peripheral tester 10 as well as running one of a number tests on the peripheral 26 under test or the cable 24 connected to the peripheral 26. The following is a brief description of such tests and is provided by way of example only and not limitation. It will be understood that any type of peripheral or cable test may be programmed into the memory 52 of the peripheral tester 10 to check any parameter or characteristic of the peripheral 26 or cable 24.

Figure 6A:
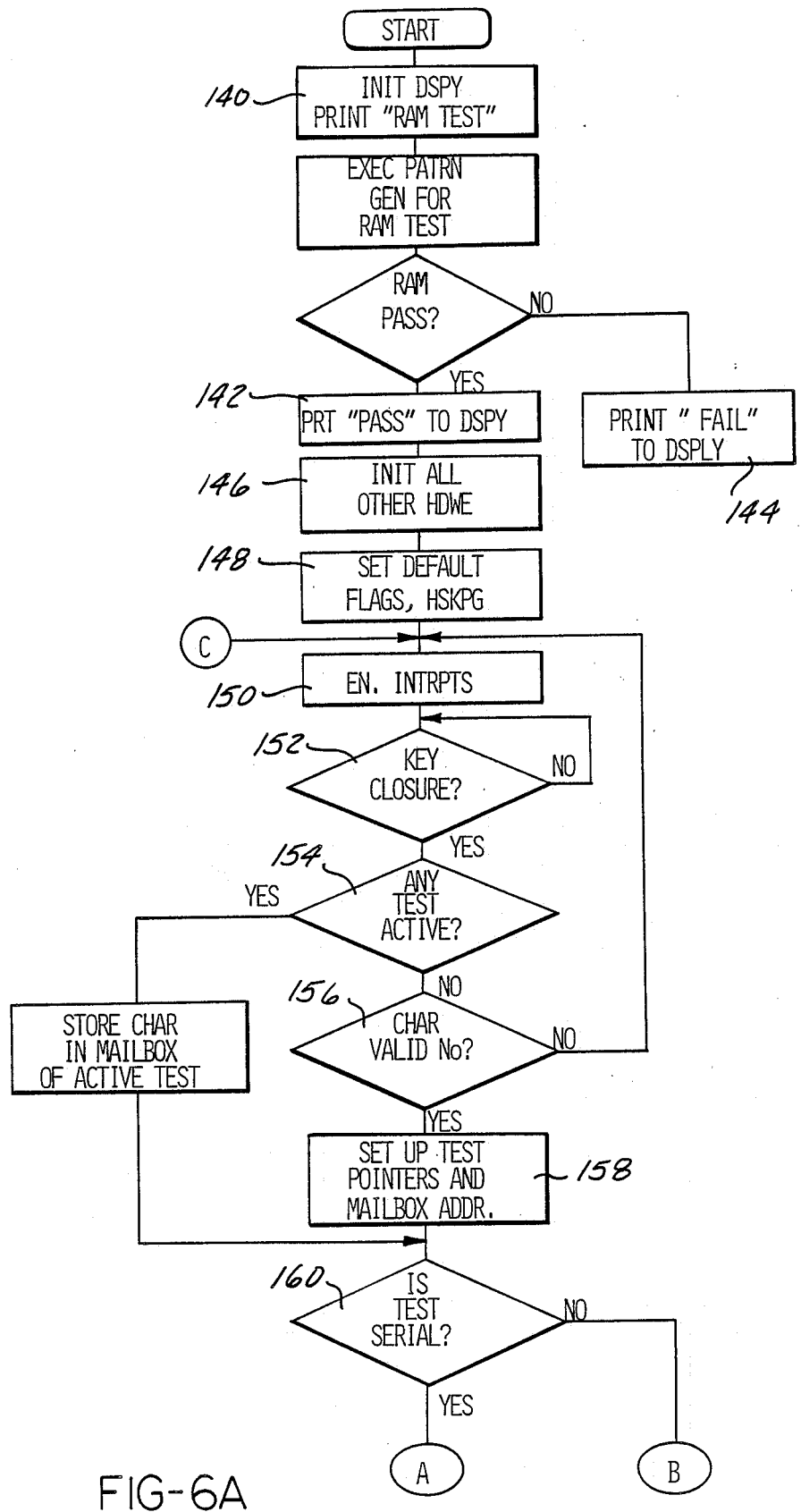
FIGS. 6A and 6B are flow charts depicting the sequence of operation of the peripheral tester in executing the control program.
Figure 6B:
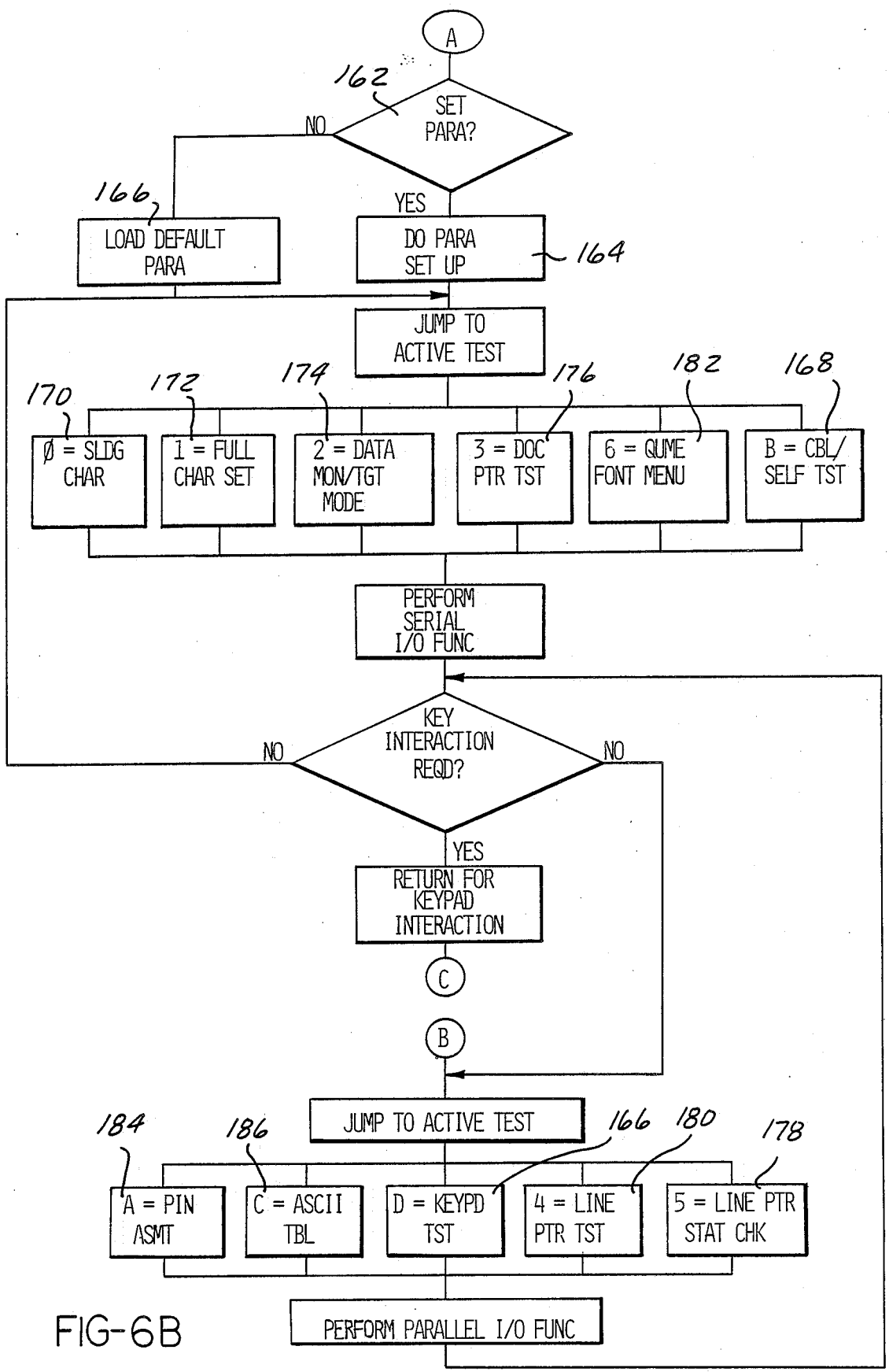

In a preferred embodiment, the peripheral tester 10 automatically executes a control program depicted in flow chart form in FIGS. 6A and 6B stored in the memory 52 to test the operability of the memory 52 immediately upon power up. The CPU 40 will automatically conduct a RAM test during which the display 18 will display "RAM TEST", step 140, FIG. 6A. Approximately four seconds after power has been applied to the peripheral tester 10, the word "PASSED" or "FAILED" is displayed in the display 18, steps 142 or 144, respectively. If the peripheral tester 10 passes the RAM TEST, a message appears on the display 18 a follows "SELECTS TEST 0-6 OR F FOR MENU."

Following the RAM test, the peripheral tester 10 initiates all other hardware, step 146, sets default flags and performs general housekeeping, step 148, enables interrupts, step 150 and check for closure of one of the keys 16 in the keyed 14, step 152.

When a key 16 is depressed the tester 10 checks if any other test is active, step 154, and if the input character number is valid, step 156. Next, after setting up test pointers and mailbox addrees for a test, step 158, the tester control program checks whether a serial test has been selected, step 160.

Depressing the F key 16 causes a menu displaying all of the tests available to be displayed on the display 18. In a preferred embodiment, these tests include:

0=SLIDING CHARACTER
1=FULL CHARACTER SET
2=DATA MONITOR
3=DOCUMENT PRINTER TEST
4=LINE PRINTER TEST
5=LINE PRINTER STATUS CHECK
6=QUME FONT MENU
A=PIN ASSIGNMENTS
B=CABLE/SELF TEST
C=ASCII TABLE
D=KEY PAD TEST

Tests 0, 1, 2, 3, 6 and B are serial tests and are run via subroutine A in FIG. 6B; while tests 4, 5, A, C and B are parallel tests executed by subroutines B.

As noted above, the keys 16 of the keypad 14 have been assigned various control functions. The D key 16 is used to disable a function; while the E key enables a function. The F key 16 exits any test currently being executed. At any other time, the F key 16 is used to select a menu in order to select another test to be executed.

Every serial test performed by the peripheral tester 10 supports the setting of parameters relating to the serial data communication between the peripheral tester 10 and the peripheral 26 under test. When a serial test is first entered, subroutine A, FIG. 6B, the message "SET PARAMETERS?" is displayed on the display 18, step 162. Depressing the E key 16 enables the setting of the parameters, step 164, and the message "BAUD RATE?" is displayed on the top line of the display 18 with the default item or the last selected item displayed on the bottom line of the display 18. To disable and select the next item within the parameter, the D key 16 is depressed. To enable the item within that parameter, the E key 16 is depressed. The various parameters provided in a preferred embodiment of the peripheral tester 10 include baud rates of 1200, 2400, 4800 and 9600, data length of seven or eight bits, even, odd, none or mark parity, one/two stop bits, yes or no automatic line feed, and 80 or 132 character page width. Default parameters may also be selected, step 166. The parameters are selected to match the program and operation of the peripheral tester 10 to that with which the peripheral 26 under test has been set to operate.

The program jumps to an active mode and runs the selected serial test. A similar sequence is followed in subroutine B for parallel tests.

Depressing the D key 16 in the keypad 14 initiates a KEYPAD test 166 and a message "D=KEYPAD TEST" appears in the top line of the display 18. Depression of any or all keys 16 on the keypad 14 should echo that character in the bottom line of the display 18. Pressing the F key 16 twice in succession terminates the KEYPAD TEST and the display 18 should again display the select test message described above.

A CABLE/SELF test 168 may also be performed on the peripheral tester 10 or the RS232 cable 24 used with a particular peripheral 26. A jumper plug is placed between pins 2 and 3 of the connector 20 or the pins 2 and 3 of the cable 24 end. Parameters are set, as described hereafter, and the self test is initiated. Pressing the B key 16 in the keypad 14 initiates the cable/self test and the message "TESTING RS232" is displayed in the display 18. The peripheral tester 10 receives data that it transmit either through the jumper on the connector 20 or through the jumper connected to the cable 24 end and checks for parity errors, framing errors, wrong baud rate, etc. At the completion of the test, the bottom line of the display 18 will display "PASS" or "FAIL" along with a test count.

The SLIDING CHARACTER and FULL CHARACTER set tests 170 and 172, respectively, are identical with the only difference being the data pattern. The sliding character test 170 offsets the first letter of the alphabet by one space each time the full alphanumeric data set is transmitted from the peripheral tester 10 to the peripheral 26 under test. Under either of these tests, the alphanumeric character set is transmitted to the serial peripheral 26 in a full or sliding pattern. Any error in the peripheral 26 under test can be detected. Any software flow control character transmitted by the serial peripheral 26 under test will be received by the peripheral tester 10 and displayed in the lower left corner of the display 18. Hardware flow control or software flow control is automatically supported depending on cable configuration.

The data monitor test 174 consists of two parts: DATA MONITOR and TARGET MODE. It may also be used to receive messages from a remote location. When the DATA MONITOR test is selected, the peripheral tester 10 is configured to receive input data from a peripheral 26 under test. As the data is received, each character is displayed on the display 18 and echoed back to the peripheral 26. If a character is received with a bad parity, with a framing error, or at a baud rate that does not match the baud rate programmed into the peripheral tester 10, a question mark "?" is displayed on the display 18.

If an "^N" (control N) is received by the peripheral tester 10 during the execution of any of the serial sliding character, full character or document printer tests, an asterisk "*" will be displayed in the upper right corner of the display 18 indicating a message request. The DATA MONITOR test is then entered. As soon as this test is entered, a message "BEGIN MESSAGE" is transmitted to the remote peripheral 26 under test indicating that the peripheral tester 10 is ready to receive the message. A message of any length, such as, "this thermal works", "test next port", etc., may be typed including carriage returns and line feeds.

In the TARGET MODE test, any two digit hex character from 00–FF may be input from the keypad 14. The peripheral tester 10 monitors all incoming data looking for the selected character. For each occurrence of that character, the hex code is displayed on the lower line of the display 18.

The purpose of the DOCUMENT PRINTER test 176 is to check the controller boards within certain hosts or branch boxes, cabling or certain document insert printers. The document printer test consists of a vertical tab test, a horizontal tab test, one line of double-width character and a plurality of lines covering the entire alphanumeric character set.

The LINE PRINTER test 180 tests the vertical format unit of a printer 26 under test as well as the entire alphanumeric character set. The test may be used on all Data Products, Inc., band and drum printers, M200 parallel printers, and certain magnetic printers.

The LINE PRINTER STATUS CHECK test 178 checks the status of a line printer interface. Once initiated, the status of a line printer attached to the peripheral tester 10 is displayed on the bottom line of the display 18. The two statuses "ONLINE" or "OFFLINE" and DEMAND =H OR DEMAND=L are monitored and should change each time the on line switch on the line printer is depressed.

The QUME FONT MENU 182 is a program to select one of several different font styles supported by a laser page printer manufacture by Qume Corporation. The bottom line of the display 18 lists the type face style, point size (height) and font orientation for a particular font. When the D key 16 is depressed, information regarding the next font is displayed. Once the desired font is displayed, the E key 16 is depressed. The stored program then downloads the font file to select the desired font within the Qume Corp. printer.

The PIN ASSIGNMENT test 184 is actually a programming option to program the pins 2 and 3 of the connector 20 in a serial mode for transmit or receive to DCE or DTE equipment, as described above, depending upon the cable configuration. Once initiated, the following message is displayed on the display 18: "2=TRANSMIT 3=RECEIVE". This is the default setting for DTE equipment. Depressing the D key 16 causes the DCE equipment configuration to be displayed as "2=RECEIVE 3=TRANSMIT".

The ASCII table 186 is a rotary conversion table for reference purposes. The bottom line of the display 18 contains the mneumonic (if a non-printable control character) or the ASCII character on the left of the equal "=" sign. The right side of the equal sign contains the two or three digit code conversion for the character in the selected radix followed by the current radix base. For example, "A=41<HEX". The user may move up and down the ASCII table by using the E and D keys 16, respectively. To convert to another radix, the C key 16 is depressed and the above example would be displayed as 37 A=101<OCTAL". The F key 16 is used to exit the ASCII table. It should be noted that any radix may be programmed, such as decimal, etc.

Thus, there has been disposed a unique computer peripheral tester which can test most types of computer peripherals and their associated cables. It is capable of running a number of different tests on the peripheral and its cable to determine proper operation and/or location of any malfunction.

What is claimed is:

1. A computer peripheral tester for testing a serial or parallel data communication computer peripheral having a data communication cable, the computer peripheral being external to a computer, comprising:

central processing means;

memory means for storing data and control program instructions executed by the central processing means;

keypad input means for inputting commands to the central processing means;

display means, responsive to the central processing means, for displaying characters;

serial communcation interface means for converting parallel data from the central processing means to serial data and serial data to parallel data input to the central processing means;

parallel communication interface means interfacing the central processing means to the computer peripheral for parallel data communication;

the serial and parallel communication inteface means operating at different voltage levels;

connecto means including a plurality of contacts for releasable connection to the data communication capable attached to a computer peripheral;

bus means for connecting the central processing means, the memory means, the keypad input means, the display means, the serial communication interface means, and the parallel communication interface means in data communication; and serial/parallel switch means, connected to the connector means, the serial communication interface means and the parallel communication interface means, for selectively connecting the serial communication interface means and the parallel communication interface means to the connector means for one of serial and parallel data communication, respectively, between the central processing means and the computer peripheral.

2. The computer peripheral tester of claim 1 further including:
programmable baud rate generator means, connected to the bus means and the serial communication interface means and responsive to the central processing means and the keypad input means, for generating a plurality of selectible serial baud data transmission rates.

3. The computer peripheral tester of claim 1 wherein the serial/parallel switch means is manually operated.

4. The computer peripheral tester of claim 1 further comprising:
serial data communication configuration means, responsive to the central processing means and connected to two separate leads of the serial communication interface means, for configuring two contacts in the connector means to selectively and alternatingly transmit and receive data between an external computer peripheral attached to the connector means and the two leads of the serial communication interface means.

5. The computer peripheral tester of claim 4 wherein the serial data communication configuration means comprises:
switch means, switchable between first and second positions, for configuring when in the first position, one contact of the two contacts of the connector means to transmit data from one of the leads of the serial communication interface means and the other contact of the two contacts of the connector means to receive data on the other of the leads and, when in the second position, for configuring the one contact to receive data from the connector means on the other of the leads and the other contact to transmit data from the one of the leads.

6. A computer peripheral tester for testing a serial or parallel date communication computer peripheral having a data communication cable, the computer peripheral being external to a computer, comprising:
central processing means;
memory means for storing data and control program instructions executed by the central processing means;
keypad input means for inputting commands to the central processing means;
display means, responsive to the central processing means, for displaying characters;
serial communication interface means for converting parallel data from the central processing means to serial data and serial data to parallel data input to the central processing means;
parallel communication interface means interfacing the central processing means to the computer peripheral for parallel data communication;
connector means connectible to the data communication cable attached to a computer peripheral;
serial data communication configuration means, responsive to the central processing means and connected to two separate leads of the serial communication interface means, for configuring two contact in the connector means to selectively and alternatingly transmit and receive data between an external computer peripheral attached to the connector means and the two leads of the serial communication interface means; and
bus means for connecting the central processing means, the memory means, the keypad input means, the display means, the serial communication interface means, the parallel communication interface means and the serial data communication configuration means in data communication.

7. The computer peripheral tester of claim 6 wherein the serial data communication configuration means comprises:
switch means, switchable between first and second positions, for configuring, when in the first position, one contact of the two contacts of the connector means to transmit data from one of the leads of the serial communication interface means and the other contact of the two contacts of the connector means to receive data on one of the leads from the connector means and, when in the second position, for configuring the one contact to receive data on the other of the leads and the other contact to transmit data from the one of the leads.

8. The computer peripheral tester of claim 7 further including:
one lead of the serial communication interface means being for transmitting serial data;
the other lead of the serial communication interface means being for receiving serial data;
first and second pairs of buffers, each buffer comprising two tri-state buffers connected in parallel to each of the two leads of the serial communication interface means;
first and second transmitter drivers, each connected to one buffer of the first pair of buffers;
first and second receivers, each connected to one buffer of the second pair of buffers;
the switch means comprising first and second switches, each switchable between two positions, the first and second switches being respectively connected to the two contacts of the connector means;
the first switch swicthably and alternatingly connecting the one contact of the connector means to the first transmitter driver and the first receiver when switched between the two positions; and
the second switch switchably and alternatingly connecting the other contact of the connector means to the second transmitter driver and the second receiver when switched between the two positions.

9. The computer peripheral tester of claim 8 wherein the first and second transmitter drivers and the first and second receivers each include signal level conversion means for converting input signal voltages to output signals of a different voltage.

10. The computer peripheral tester of claim 6 wherein the serial data configuration means comprises:
signal level converting means connected to the two leads of the serial communication interface means and the two contacts of the connector means for converting the signal level of the signals on the two leads of the serial communication interface means to different signal levels on the two contacts of the connector means.

11. The computer peripheral tester of claim 1 further including:
RS422 interface means, removably connected between the data communication cable of the computer peripheral and the connector means, for providing parallel, differential-ended data communication between the external computer peripheral and the parallel communication interface means.

* * * * *